M. P. HALL.
Traction Engine.

No. 106,577. Patented August 23, 1870.

Witnesses

Inventor

United States Patent Office.

MOSES P. HALL, OF HINSDALE, NEW YORK.

Letters Patent No. 106,577, dated August 23, 1870.

---

IMPROVEMENT IN TRACTION-ENGINES.

---

The Schedule referred to in these Letters Patent and making part of the same.

---

To all whom it may concern:

Be it known that I, MOSES P. HALL, of Hinsdale, in the county of Cattaraugus and State of New York, have invented a new and useful Improvement in Traction Engine; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
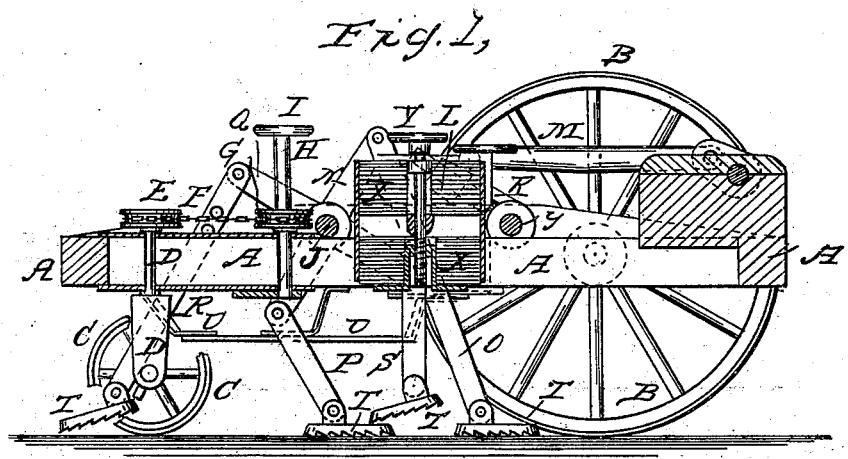
Figure 1 is a vertical longitudinal section of my improved engine, taken through the line $x\,x$, fig. 2.
Figure 2:
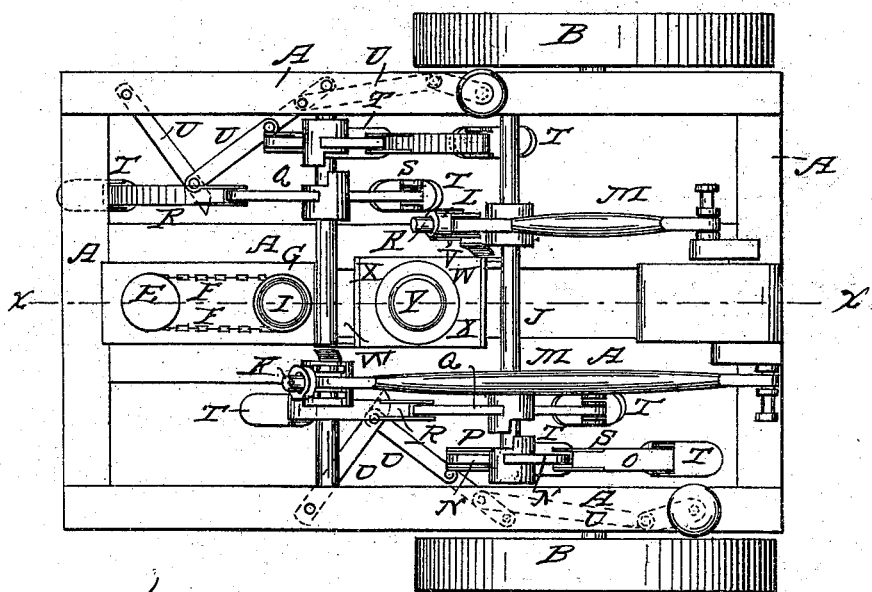
Figure 2 is a top view of the same.

My invention has for its object to furnish a simple and convenient engine to take the place of animal power, for various farm purposes, for towing canal-boats, and other uses where the continuous untiring exertion of power is required, and which will apply the power in the most natural and direct manner; and It consists in the construction and combination of various parts of the apparatus, as hereinafter more fully described.

I propose using as a motive power Thomas Mitchell's steam-generator, with two cylinders, but any suitable steam, hot-air, or electrical engine may be used.

A is the frame-work of the machine, to the rear part of which are attached axles, upon which the wheels B work.

The front end of the machine is supported upon the caster-wheel C, the standard D of which passes up through the forward part of the frame A, and to the upper end of which is attached a grooved pulley, E, around which passes an endless chain, F.

The chain F also passes around a pulley, G, attached to a vertical shaft, H, the lower end of which works in bearings attached to the frame A, and to the upper end of which is attached a hand-wheel, I, by means of which the machine may be conveniently, easily and accurately guided.

J are shafts, which revolve in bearings in the frame A, or in supports attached to said frame.

To the shafts J are rigidly attached arms or levers K, upon which are placed sockets L, to the sides of which are pivoted the ends of the connecting-rods M, to the other ends of which the power is applied.

To the shafts J are attached cross-arms N, with their upper ends inclined to the rear, to the upper ends of which is pivoted the upper end of a bar, O.

To the lower or forward end of the cross-arms N are pivoted the upper ends of the short rods P.

Upon the shafts J is also placed another set of cross-arms, Q, provided with clutches, so that they may be conveniently thrown into gear with the said shafts J when it is desired to back the machine.

To the upper and lower ends of the cross-arms Q are pivoted long bars R and short bars S, exactly like the bars O P, but arranged in a reversed position.

To the lower ends of the rods or bars O P R S are pivoted shoes T, the lower sides of which are roughened, corrugated, or toothed, to enable them to take a firm hold upon the ground.

U are frame-works or bars, connected with the frame A, and provided with a shaft and hand-wheel, or with a lever or other convenient means for operating it, so that the said bars or frame-work may be conveniently adjusted to raise either set of legs or bars away from the ground, according as it is desired to have the machine advance or move back.

To the sockets L are pivoted the upper ends of short bars V, the lower ends of which are pivoted to arms W, attached to a block, X, which is swiveled to a hand-screw, Y, which works in a stationary nut, Z, attached to the frame A, so that, by turning the said screw in one or the other direction, the sockets L will be raised or lowered upon the arms or levers K, as may be desired.

By lowering the sockets L upon the arms or levers K, the step will be lengthened and the speed will be increased, and by raising the said sockets L upon the said arms or levers K the step will be shortened and the power increased, without changing or interfering with the motive power.

Having thus described my invention,

I claim as new, and desire to secure by Letters Patent—

1. The pivoted feet T, pivoted bars or legs O P R S, cross-arms N Q, one or more shafts J, arms or levers K, sockets L, and pivoted connecting-rods M, with each other and with the frame-work of the machine or carriage, substantially as herein shown and described, and for the purpose set forth.

2. The combination of the stationary nut Z, hand-screw Y, swiveled block X, arms M, and pivoted connection-rods V with the sockets L, working upon the arms or levers K attached to the rock-shafts J, and to which the connecting-rods M are pivoted, substantially as herein shown and described, and for the purpose set forth.

3. The combination of the movable frame or bars U, or their substantial equivalents, with the pivoted bars or legs O P R S and frame-work A of the machine, substantially as herein shown and described, and for the purpose set forth.

MOSES. P. HALL.

Witnesses:
WARREN N. JOHNSON,
T. B. WASSON.